(12) United States Patent
Cota-Robles et al.

(10) Patent No.: US 7,296,267 B2
(45) Date of Patent: Nov. 13, 2007

(54) SYSTEM AND METHOD FOR BINDING VIRTUAL MACHINES TO HARDWARE CONTEXTS

(75) Inventors: Erik C. Cota-Robles, Portland, OR (US); Randolph L. Campbell, Sacramento, CA (US); Clifford D. Hall, Orangevale, CA (US); Gilbert Neiger, Portland, OR (US); Richard A. Uhlig, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 701 days.

(21) Appl. No.: 10/194,822

(22) Filed: Jul. 12, 2002

(65) Prior Publication Data

US 2004/0010788 A1    Jan. 15, 2004

(51) Int. Cl.
*G06F 9/455* (2006.01)
*G06F 9/46* (2006.01)

(52) U.S. Cl. .......................... 718/1; 718/104; 709/225; 702/179

(58) Field of Classification Search ................ 718/1, 718/100–108; 702/179–182; 714/25–31, 714/37, 39; 709/224, 225
See application file for complete search history.

(56) References Cited

U.S. PATENT DOCUMENTS

| | | | |
|---|---|---|---|
| 3,699,532 A | 10/1972 | Schaffer et al. | |
| 3,996,449 A | 12/1976 | Attanasio et al. | |
| 4,037,214 A | 7/1977 | Birney et al. | |
| 4,162,536 A | 7/1979 | Morley | |
| 4,207,609 A | 6/1980 | Luiz et al. | |
| 4,247,905 A | 1/1981 | Yoshida et al. | ............. 711/166 |
| 4,276,594 A | 6/1981 | Morley | |
| 4,278,837 A | 7/1981 | Best | |
| 4,307,447 A | 12/1981 | Provanzano et al. | |
| 4,319,233 A | 3/1982 | Matsuoka et al. | |
| 4,319,323 A | 3/1982 | Ermolovich et al. | |
| 4,347,565 A | 8/1982 | Kaneda et al. | |
| 4,366,537 A | 12/1982 | Heller et al. | |

(Continued)

FOREIGN PATENT DOCUMENTS

EP        0930567 A        7/1999

(Continued)

OTHER PUBLICATIONS

Heinrich, J., "MIPS R4000 Microprocessor User's Manual," Apr. 1, 1993, MIPS, MT View, XP002184449, pp. 61-97.

(Continued)

*Primary Examiner*—William Thomson
*Assistant Examiner*—Diem K Cao
(74) *Attorney, Agent, or Firm*—Blakely, Sokoloff, Taylor & Zafman LLP

(57) ABSTRACT

System and method for binding virtual machines to hardware contexts. A method includes obtaining resource requirements for a plurality of virtual machines, and binding one or more of the plurality of virtual machines to one or more of a plurality of hardware contexts associated with a processor based upon the resource requirements. The resource requirements may be the bandwidth and latency of the virtual machines. The method may be implemented as software on a storage device on a computing device having a processor that supports multiple hardware contexts. The method is particularly beneficial for real-time virtual machines.

24 Claims, 4 Drawing Sheets

U.S. PATENT DOCUMENTS

| | | | |
|---|---|---|---|
| 4,403,283 A | 9/1983 | Myntti et al. | |
| 4,419,724 A | 12/1983 | Branigin et al. | |
| 4,430,709 A | 2/1984 | Schleupen et al. | |
| 4,521,852 A | 6/1985 | Guttag | |
| 4,571,672 A | 2/1986 | Hatada et al. | |
| 4,759,064 A | 7/1988 | Chaum | |
| 4,787,026 A * | 11/1988 | Barnes et al. | 718/100 |
| 4,795,893 A | 1/1989 | Ugon | |
| 4,802,084 A | 1/1989 | Ikegaya et al. | |
| 4,825,052 A | 4/1989 | Chemin et al. | |
| 4,907,270 A | 3/1990 | Hazard | |
| 4,907,272 A | 3/1990 | Hazard | |
| 4,910,774 A | 3/1990 | Barakat | |
| 4,975,836 A | 12/1990 | Hirosawa et al. | |
| 5,007,082 A | 4/1991 | Cummins | |
| 5,022,077 A | 6/1991 | Bealkowski et al. | |
| 5,075,842 A | 12/1991 | Lai | |
| 5,079,737 A | 1/1992 | Hackbarth | 711/164 |
| 5,187,802 A | 2/1993 | Inoue et al. | |
| 5,201,049 A * | 4/1993 | Shorter | 718/1 |
| 5,230,069 A | 7/1993 | Brelsford et al. | |
| 5,233,533 A * | 8/1993 | Edstrom et al. | 700/103 |
| 5,237,616 A | 8/1993 | Abraham et al. | |
| 5,255,379 A | 10/1993 | Melo | |
| 5,287,363 A | 2/1994 | Wolf et al. | |
| 5,293,424 A | 3/1994 | Holtey et al. | |
| 5,295,251 A | 3/1994 | Wakui et al. | |
| 5,317,705 A | 5/1994 | Gannon et al. | |
| 5,319,760 A | 6/1994 | Mason et al. | |
| 5,361,375 A | 11/1994 | Ogi | |
| 5,386,552 A | 1/1995 | Garney | |
| 5,421,006 A | 5/1995 | Jablon et al. | |
| 5,434,999 A | 7/1995 | Goire et al. | |
| 5,437,033 A | 7/1995 | Inoue et al. | |
| 5,442,645 A | 8/1995 | Ugon et al. | |
| 5,455,909 A | 10/1995 | Blomgren et al. | |
| 5,459,867 A | 10/1995 | Adams et al. | |
| 5,459,869 A | 10/1995 | Spilo | |
| 5,469,557 A | 11/1995 | Salt et al. | |
| 5,473,692 A | 12/1995 | Davis | |
| 5,479,509 A | 12/1995 | Ugon | |
| 5,504,922 A | 4/1996 | Seki et al. | |
| 5,506,975 A * | 4/1996 | Onodera | 718/1 |
| 5,511,217 A | 4/1996 | Nakajima et al. | |
| 5,522,075 A | 5/1996 | Robinson et al. | |
| 5,528,231 A | 6/1996 | Patarin | |
| 5,530,860 A * | 6/1996 | Matsuura | 718/105 |
| 5,533,126 A | 7/1996 | Hazard et al. | |
| 5,555,385 A | 9/1996 | Osisek | |
| 5,555,414 A | 9/1996 | Hough et al. | |
| 5,560,013 A | 9/1996 | Scalzi et al. | |
| 5,564,040 A | 10/1996 | Kubala | |
| 5,566,323 A | 10/1996 | Ugon | |
| 5,568,552 A | 10/1996 | Davis | |
| 5,572,694 A * | 11/1996 | Uchino | 718/1 |
| 5,574,936 A | 11/1996 | Ryba et al. | |
| 5,582,717 A | 12/1996 | Di Santo | |
| 5,604,805 A | 2/1997 | Brands | |
| 5,606,617 A | 2/1997 | Brands | |
| 5,615,263 A | 3/1997 | Takahashi | |
| 5,628,022 A | 5/1997 | Ueno et al. | |
| 5,633,929 A | 5/1997 | Kaliski, Jr. | |
| 5,657,445 A | 8/1997 | Pearce | |
| 5,668,971 A | 9/1997 | Neufeld | |
| 5,684,948 A | 11/1997 | Johnson et al. | |
| 5,706,469 A | 1/1998 | Kobayashi | |
| 5,717,903 A | 2/1998 | Bonola | |
| 5,720,609 A | 2/1998 | Pfefferle | |
| 5,721,222 A | 2/1998 | Bernstein et al. | |
| 5,729,760 A | 3/1998 | Poisner | |
| 5,737,604 A | 4/1998 | Miller et al. | |
| 5,737,760 A | 4/1998 | Grimmer, Jr. et al. | 711/163 |
| 5,740,178 A | 4/1998 | Jacks et al. | |
| 5,752,046 A | 5/1998 | Oprescu et al. | |
| 5,757,919 A | 5/1998 | Herbert et al. | |
| 5,764,969 A | 6/1998 | Kahle et al. | |
| 5,796,835 A | 8/1998 | Saada | |
| 5,796,845 A | 8/1998 | Serikawa et al. | |
| 5,805,712 A | 9/1998 | Davis | |
| 5,809,546 A | 9/1998 | Greenstein et al. | |
| 5,825,875 A | 10/1998 | Ugon | |
| 5,825,880 A | 10/1998 | Sudia et al. | |
| 5,835,594 A | 11/1998 | Albrecht et al. | |
| 5,838,968 A * | 11/1998 | Culbert | 718/104 |
| 5,844,986 A | 12/1998 | Davis | |
| 5,852,717 A | 12/1998 | Bhide et al. | |
| 5,854,913 A | 12/1998 | Goetz et al. | |
| 5,867,577 A | 2/1999 | Patarin | |
| 5,872,994 A | 2/1999 | Akiyama et al. | |
| 5,890,189 A | 3/1999 | Nozue et al. | |
| 5,900,606 A | 5/1999 | Rigal | |
| 5,901,225 A | 5/1999 | Ireton et al. | |
| 5,903,752 A | 5/1999 | Dingwall et al. | |
| 5,919,257 A | 7/1999 | Trostle | |
| 5,935,242 A | 8/1999 | Madany et al. | |
| 5,935,247 A | 8/1999 | Pai et al. | |
| 5,937,063 A | 8/1999 | Davis | |
| 5,953,502 A | 9/1999 | Helbig, Sr. | |
| 5,956,408 A | 9/1999 | Arnold | |
| 5,970,147 A | 10/1999 | Davis et al. | |
| 5,978,475 A | 11/1999 | Schneier et al. | |
| 5,978,481 A | 11/1999 | Ganesan et al. | |
| 5,987,557 A | 11/1999 | Ebrahim | |
| 6,014,745 A | 1/2000 | Ashe | |
| 6,035,374 A | 3/2000 | Panwar et al. | |
| 6,044,478 A | 3/2000 | Green | |
| 6,055,637 A | 4/2000 | Hudson et al. | |
| 6,058,478 A | 5/2000 | Davis | |
| 6,061,794 A | 5/2000 | Angelo | |
| 6,075,938 A | 6/2000 | Bugnion et al. | |
| 6,085,296 A | 7/2000 | Karkhanis et al. | |
| 6,088,262 A | 7/2000 | Nasu | |
| 6,092,095 A | 7/2000 | Maytal | |
| 6,093,213 A | 7/2000 | Favor et al. | |
| 6,101,584 A | 8/2000 | Satou et al. | |
| 6,108,644 A | 8/2000 | Goldschlag et al. | |
| 6,115,816 A | 9/2000 | Davis | |
| 6,125,430 A | 9/2000 | Noel et al. | |
| 6,131,166 A | 10/2000 | Wong-Insley | |
| 6,148,379 A | 11/2000 | Schimmel | |
| 6,158,546 A | 12/2000 | Hanson et al. | |
| 6,173,417 B1 | 1/2001 | Merrill | |
| 6,175,924 B1 | 1/2001 | Arnold | |
| 6,175,925 B1 | 1/2001 | Nardone et al. | |
| 6,178,509 B1 | 1/2001 | Nardone et al. | |
| 6,182,089 B1 | 1/2001 | Ganapathy et al. | |
| 6,188,257 B1 | 2/2001 | Buer | |
| 6,192,455 B1 | 2/2001 | Bogin et al. | |
| 6,199,152 B1 | 3/2001 | Kelly et al. | |
| 6,205,550 B1 | 3/2001 | Nardone et al. | |
| 6,212,635 B1 | 4/2001 | Reardon | |
| 6,222,923 B1 | 4/2001 | Schwenk | |
| 6,249,872 B1 | 6/2001 | Wildgrube et al. | 713/200 |
| 6,252,650 B1 | 6/2001 | Nakamura | |
| 6,269,392 B1 | 7/2001 | Cotichini et al. | |
| 6,272,533 B1 | 8/2001 | Browne | 709/213 |
| 6,272,637 B1 | 8/2001 | Little et al. | 713/194 |
| 6,275,933 B1 | 8/2001 | Fine et al. | |
| 6,282,650 B1 | 8/2001 | Davis | |
| 6,282,651 B1 | 8/2001 | Ashe | |
| 6,282,657 B1 | 8/2001 | Kaplan et al. | |
| 6,292,874 B1 | 9/2001 | Barnett | 711/153 |
| 6,301,646 B1 | 10/2001 | Hostetter | |
| 6,308,270 B1 | 10/2001 | Guthery et al. | |

| | | |
|---|---|---|
| 6,314,409 B1 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng |
| 6,339,816 B1 | 1/2002 | Bausch |
| 6,357,004 B1 | 3/2002 | Davis |
| 6,363,485 B1 | 3/2002 | Adams |
| 6,374,286 B1 | 4/2002 | Gee et al. |
| 6,374,317 B1 | 4/2002 | Ajanovic et al. ........... 710/105 |
| 6,378,068 B1 | 4/2002 | Foster |
| 6,378,072 B1 | 4/2002 | Collins et al. |
| 6,389,537 B1 | 5/2002 | Davis et al. |
| 6,397,242 B1 | 5/2002 | Devine et al. |
| 6,397,379 B1 | 5/2002 | Yates, Jr. et al. |
| 6,408,393 B1* | 6/2002 | Imada et al. ................ 713/300 |
| 6,412,035 B1 | 6/2002 | Webber |
| 6,421,702 B1 | 7/2002 | Gulick |
| 6,435,416 B1 | 8/2002 | Slassi |
| 6,445,797 B1 | 9/2002 | McGough et al. |
| 6,463,535 B1 | 10/2002 | Drews et al. |
| 6,463,537 B1 | 10/2002 | Tello |
| 6,466,962 B2* | 10/2002 | Bollella ...................... 718/107 |
| 6,496,847 B1* | 12/2002 | Bugnion et al. ............... 718/1 |
| 6,499,123 B1 | 12/2002 | McFarlane et al. |
| 6,505,279 B1 | 1/2003 | Phillips et al. |
| 6,507,904 B1 | 1/2003 | Ellison et al. |
| 6,529,909 B1 | 3/2003 | Bowman-Amuah |
| 6,535,988 B1 | 3/2003 | Poisner |
| 6,557,104 B2 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,633,963 B1 | 10/2003 | Ellison et al. |
| 6,633,981 B1 | 10/2003 | Davis |
| 6,651,171 B1 | 11/2003 | England et al. |
| 6,678,825 B1 | 1/2004 | Ellison et al. |
| 6,684,326 B1 | 1/2004 | Cromer et al. |
| 6,807,522 B1* | 10/2004 | Orfali .......................... 703/22 |
| 6,859,926 B1* | 2/2005 | Brenner et al. ............. 718/100 |
| 6,947,988 B1* | 9/2005 | Saleh .......................... 709/226 |
| 2001/0021969 A1 | 9/2001 | Burger et al. |
| 2001/0027511 A1 | 10/2001 | Wakabayashi et al. |
| 2001/0027527 A1 | 10/2001 | Khidekel et al. |
| 2001/0037450 A1 | 11/2001 | Metlitski et al. |
| 2002/0007456 A1 | 1/2002 | Peinado et al. |
| 2002/0023032 A1 | 2/2002 | Pearson et al. |
| 2002/0147916 A1 | 10/2002 | Strongin et al. |
| 2002/0152305 A1* | 10/2002 | Jackson et al. ............. 709/224 |
| 2002/0166061 A1 | 11/2002 | Falik et al. |
| 2002/0169717 A1 | 11/2002 | Challener |
| 2003/0018892 A1 | 1/2003 | Tello |
| 2003/0037089 A1* | 2/2003 | Cota-Robles et al. .......... 709/1 |
| 2003/0074548 A1 | 4/2003 | Cromer et al. |
| 2003/0115453 A1 | 6/2003 | Grawrock |
| 2003/0126442 A1 | 7/2003 | Glew et al. |
| 2003/0126453 A1 | 7/2003 | Glew et al. |
| 2003/0159056 A1 | 8/2003 | Cromer et al. |
| 2003/0188179 A1 | 10/2003 | Challener et al. |
| 2003/0196085 A1 | 10/2003 | Lampson et al. |
| 2003/0225878 A1* | 12/2003 | Eatough et al. ............. 709/224 |
| 2004/0117539 A1 | 6/2004 | Bennett et al. |
| 2004/0143664 A1* | 7/2004 | Usa et al. .................... 709/226 |

FOREIGN PATENT DOCUMENTS

| | | |
|---|---|---|
| WO | WO9834365 A | 8/1998 |
| WO | WO9844402 | 10/1998 |
| WO | WO9905600 | 2/1999 |
| WO | WO9909482 | 2/1999 |
| WO | WO9957863 | 11/1999 |
| WO | WO0062232 | 10/2000 |

OTHER PUBLICATIONS

Heinrich, J., "MIPS R4000 Microprocessor User's Manual," 1994, MIPS Technology, Inc., Mountain View, CA, pp. 67-79.

"M68040 User's Manual," 1993, Motorola, Inc., pp. 1-20.

"Intel 386 DX Microprocessor 32-Bit CHMOS Microprocessor With Integrated Memory Management," Dec. 31, 1995, Intel, Inc., pp. 32-56; figures 4-14.

Berg, C., "How Do I Create A Signed Applet?," Dr. Dobb's Journal, M&T Publ., Redwood City, CA, US, vol. 22, No. 8, Aug. 1997, pp. 109-111, 122.

Gong, L., et al., "Going Beyond the Sandbox: An Overview of the New Security Architecture in the Java Development Kit 1.2," Proceedings of the Usenix Symposium on the Internet Technologies and Systems, Monterrey, CA Dec. 1997, pp. 103-112.

Goldberg, R., "Survey of virtual machine research," IEEE Computer Magazine 7(6), pp. 34-45, 1974.

Gum, P.H., "System/370 Extended Architecture: Facilities for Virtual Machines," IBM J. Research Development, vol. 27, No. 6, pp. 530-544, Nov. 1983.

Rosenblum, M. "Vmware's Virtual Platform: A Virtual Machine Monitor for Commodity PCs," Proceedings of the 11th Hotchips Conference, pp. 185-196, Aug. 1999.

Lawton, K., "Running Multiple Operating Systems Concurrently on an IA32 PC Using Virtualization Techniques," http://www.plex86.org/research/paper.txt; Nov. 29, 1999; pp. 1-31.

"Trust Computing Platform Alliance (TCPA)," Main Specification Version 1.1a, Compaq Computer Corporation, Hewlett-Packard Company, IBM Corporation, Intel Corporation, Microsoft Corporation, Dec. 2001.

US Patent Application, "Real-Time Scheduling of Virtual Machines" U.S. Appl. No. 09/541,444, Inv(s) Cota-Robles et al., filed Mar. 31, 2000.

* cited by examiner

SYSTEM AND METHOD FOR BINDING VIRTUAL MACHINES TO HARDWARE CONTEXTS

BACKGROUND

1. Field of the Invention

This invention relates to virtual machines of a computer processor such as a microprocessor. In particular, the invention relates to a virtual machine manager that may bind virtual machines to hardware contexts of a processor in a computer or other computing device.

2. Background

An Operating System (OS) is a software program that controls physical computer hardware (e.g., a processor, memory, and disk and CD-ROM drives) and presents application programs with a unified set of abstract services (e.g., a file system). A Virtual Machine Manager (VMM) is also a software program that controls physical computer hardware such as, for example, the processor, memory, and disk drives. Unlike an OS a VMM presents programs executing within a Virtual Machine (VM) with the illusion that they are executing on real physical computer hardware that includes, for example, a processor, memory and a disk drive. Each VM typically functions as a self-contained entity, such that software executing in a VM executes as if it were running alone on a "bare" machine instead of within a virtual machine that shares a processor and other physical hardware with other VMs. It is the VMM that emulates certain functions of a "bare" machine so that software executing within a VM executes as if it were the sole entity executing on the computer.

In order to accomplish this emulation it is necessary for some operations within a VM to be trapped and emulated by the VMM. The VMM may perform a sequence of operations on simulated hardware resources in order to maintain the illusion that a VM is actually interacting with real hardware. Transitions from a VM to the VMM and back will occur with some frequency, depending upon the number of tasks which the VMM must emulate for the VM. For example, a VMM must trap and emulate attempts to configure hardware devices. This may be achieved by the VMM via simulated hardware registers in system memory.

When executing "real-time" applications, computations upon data that is available at one substantially predetermined time should be completed by another substantially predetermined time. An OS that schedules a real-time application with sufficient frequency and for sufficient duration that the real-time application is able to complete its computations before their respective deadlines is said to have received adequate scheduling Quality of Service (QoS). Similarly, a VMM that includes a VM and a real-time OS (RTOS) provides adequate scheduling QoS when real-time applications and the VMs complete execution before respective deadlines. OSs and VMMs should schedule the computing resources of their real or virtual machine in such a fashion as to ensure that real-time applications receive adequate scheduling QoS.

Many current generation microprocessors such as, for example, the Intel® Pentium® 3 and 4 microprocessors include superpipelined out of order machines where instructions need not be executed in strict program order. While such processors typically have a number of independent execution units, they only fetch instructions from a single instruction stream. Some microprocessors, including some future members of the Pentium® family of processors, will have the ability to simultaneously fetch instructions from two or more instruction streams. These instruction streams are generally called threads because they correspond to threads scheduled by the system software. Microprocessors that simultaneously fetch instructions from two or more instruction streams are variously referred to as "hyper-threaded", "multi-threaded" or "symmetric multi-threaded." On hyper-threaded microprocessors the instruction fetch units are controlled by "hardware contexts", which include both a stack pointer and an instruction pointer, a set of standard processor registers plus any additional state information necessary such as, for Pentium® family processors, control registers and translation look-aside buffer (TLB) tag bits. On out-of-order processors the nominal processor registers will generally be dynamically allocated from a pool of renameable registers, so that the actual static hardware context may be little more than a stack pointer, instruction pointer and a few control registers.

DESCRIPTION

In many processors used in various kinds of computing devices, including personal computers, a virtual machine manager (VMM) may be implemented and used to manage multiple virtual machines (VMs) that are used to provide an environment for multiple operating systems to concurrently execute. The VMM provides emulation assistance to the VMs so that software (e.g., an operating system) in each VM believes that it has sole access to and thus control of the entire computing device. In reality, the VMM shares the resources of the computing device (e.g., the processor, memory and disk drive(s)) among the multiple VMs based on the respective requirements of the software executing in each VM and the availability and suitability of system and processor resources. Thus, there may be significant overhead incurred in switching among the various VMs. According to a method described herein, the VMM may bind certain VMs to certain hardware contexts in a hyper-threaded processor. According to the methods described herein, in certain situations, it may be beneficial to bind one or more VMs, particularly real-time VMs, to one or more hardware contexts for reasons including, but not limited to, maximizing efficiency and minimizing latency and response time.

Real-time virtual machines (RTVMs) are virtual machines that contain software applications that perform computations that must complete before a deadline or deadlines as measured according to an external reference clock (i.e., a so-called "wall clock"). Among the applications that an RTVM might contain are streaming media applications, including audio and video applications, digital signal processing and communications applications, including modem and networking applications. RTVMs may also be used in other instances. Because of the fine grained machine switch requirements placed on a virtual machine system by RTVMs, an undesirable amount of overhead may be generated when the VMM switches between various VMs and RTVMs. By binding RTVMs, and, in some instances, nonreal-time VMs, to dedicated hardware contexts on a hyper-threaded processor, the overhead associated with such switching is reduced and performance of the virtual machine system is improved. Although the term "binding" is used herein, binding includes and/or is synonymous with, for example, but not limited to, assigning, aggregating, designating, allocating, distributing, or otherwise establishing and/or managing the relationship between VMs and hardware contexts.

Figure 1:
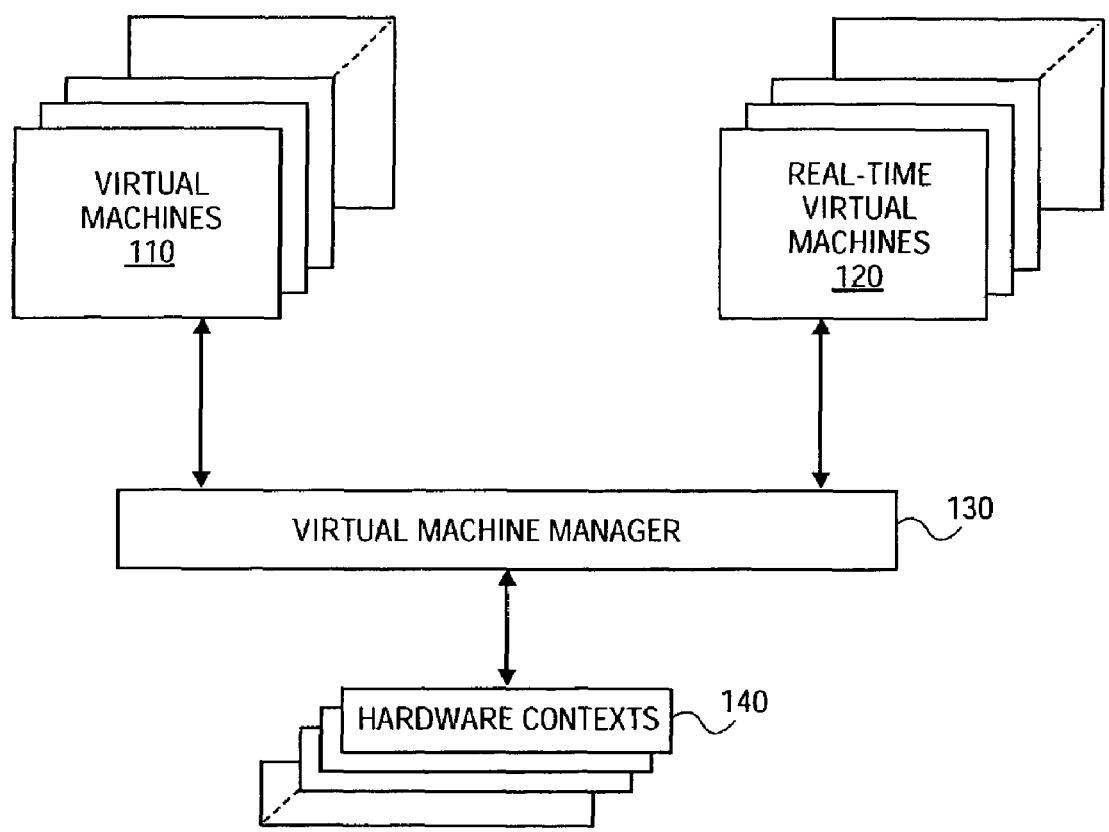
FIG. 1 illustrates a conceptual diagram of the components involved in the invention described herein.

FIG. 1 illustrates a conceptual diagram of the components involved in the invention described herein. In one embodiment, one or more virtual machines 110 and one or more real-time virtual machines 120 are managed by VMM 130. VMM 130 may permanently allocate some of hardware contexts 140 to specific virtual machines 110 and/or real-time virtual machines 120, and may dynamically allocate other hardware contexts to other virtual machines. Generally, a hardware context may be defined by various data required by a processor to execute a software task. In one embodiment, hardware contexts 140 may include an instruction pointer, a stack pointer, control registers, a micro-architecture to fetch, a micro-architecture to claim renameable registers and a micro-architecture to dispatch to shared execution units. The shared execution units may be an adder, a floating point multiplier accumulator (FMAC), and other execution units.

Figure 2:
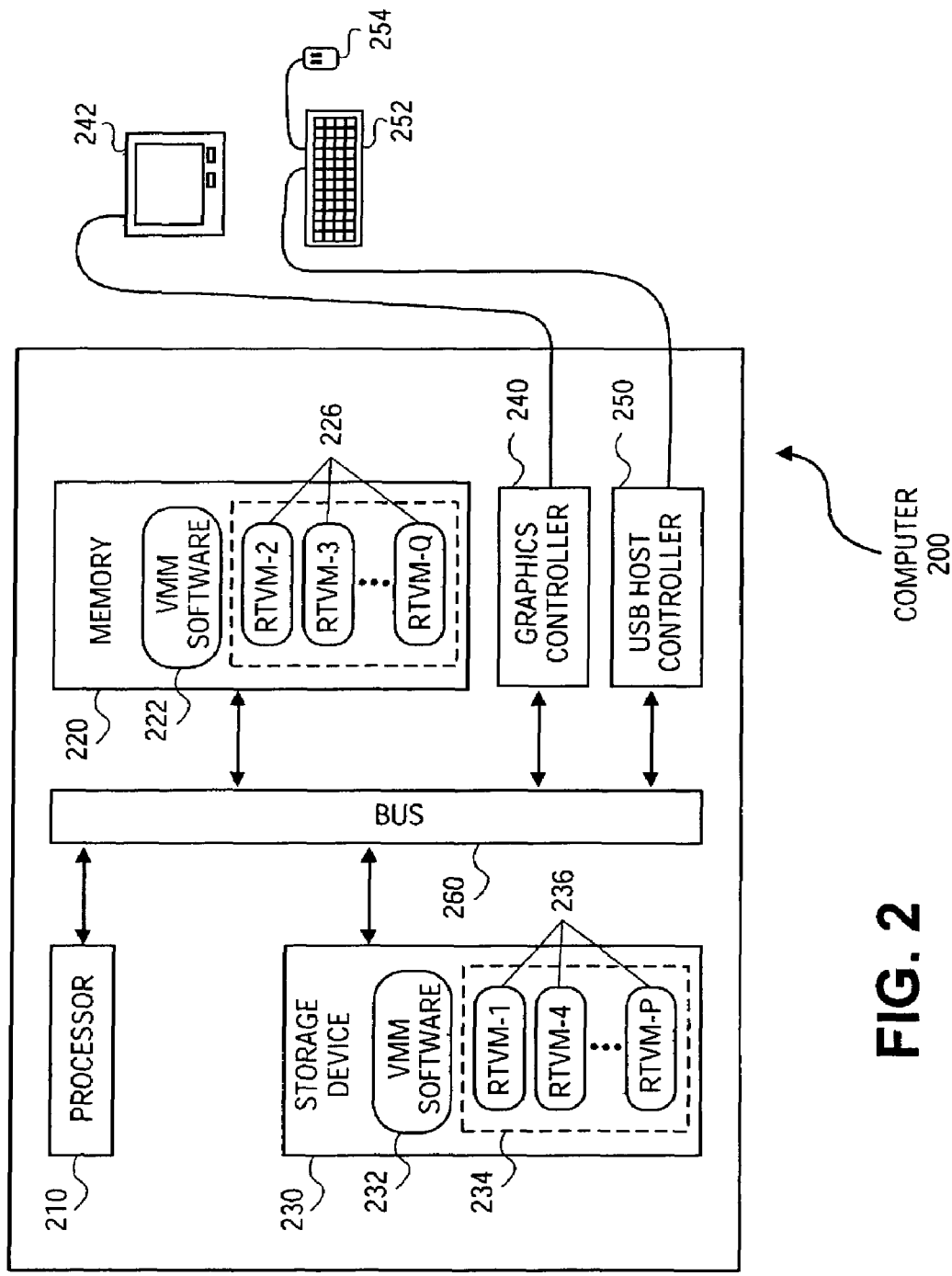
FIG. 2 illustrates a computer system in which one embodiment of the invention can be practiced.

FIG. 2 illustrates a computer system in which one embodiment of the invention can be practiced. In various embodiments, the methods described herein may be implemented in any processor in any type of computing device, including personal computers, personal digital assistants (PDAs), servers, workstations, cellular telephones, laptops, computing tablets, and the like. In one embodiment, computer system 200 includes processor 210, system memory 220, storage device 230, graphics controller 240 and Universal Serial Bus (USB) host controller 250 all coupled to bus 260. In various embodiments, one or more instances of these components, as well as other well-known components may be included in personal computer 200. Personal computer 200 may also include peripheral buses such as Peripheral Component Interconnect (PCI), accelerated graphics port (AGP), Industry Standard Architecture (ISA) bus, I.E.E.E. 1394 (aka, Firewire), etc. in addition to or in place of USB host controller 250. In one embodiment, storage device 230 may be any machine readable medium such as, for example, optical and magnetic disk drives such as floppy disks, hard disks, compact disk read-only memory (CD-ROM) readable and writeable compact disk (CD-RW), stick and card memory devices, read-only memory (ROM), random access memory (RAM), flash memory devices, and the like, whether internal, external, accessible locally or remotely via a network, and accessible via electrical, acoustic, optical or other forms of propagated signals (e.g., carrier waves, initiated signals, digital signals, etc.).

In various embodiments, the methods described herein may be implemented as software, such as VMM software 232 stored on storage device 230. When executed by processor 210, VMM software 232 is stored as VMM 222 in memory 220. When managing real-time virtual machines, the hardware contexts and the real-time virtual machines themselves may be stored as RTVM 226 in memory 220, and may be stored in and/or swapped out to storage device 230 as RTVM 236. As shown in FIG. 2, while some RTVMs (such as RTVM-2, RTVM-3, and others through RTVM-Q) may be stored in memory, other RTVMs (such as RTVM-1, RTVM-4, and others through RTVM-P) may be concurrently stored in a storage device, such as storage device 230.

In one embodiment, the software executing on personal computer 200 and in the virtual machines may have access to and communicate with users of personal computer 200 by presenting text and images via graphics controller 240 which is coupled to display 242. Similarly, a user of personal computer 200 may provide input to those programs executing as virtual machines via keyboard 252 and mouse 254 coupled to USB host controller 250.

The processor 210 represents a processing unit of any type, including embedded processors, micro-controllers, digital signal processors, superscalar computers, vector processors, single instruction multiple data (SIMD) computers, complex instruction set computers (CISC), reduced instruction set computers (RISC), very long instruction word (VLIW) computers, hybrid architecture processors, and the like. In one embodiment, the processor 210 is compatible with the 32 bit Intel Architecture (IA) processor specification, known as IA-32. In another embodiment, the processor may be compatible with other instruction sets and/or processor architectures, including the 64 bit Intel Architecture known as IA-64. For further information regarding IA-32 and IA-64 see *IA-32 Intel Architecture Software Developer's Manual*, rev. 2 (February 2001) and *Intel IA-64 Architecture Software Developer's Manual*, rev. 1.1 (July 2000) available from Intel Corporation of Santa Clara, Calif. The processor 210 may contain a number of control registers to support memory management tasks such as virtual memory and cache memory. These tasks may include paging and segmentation. In various embodiments, personal computer 200 may include two or more processors like processor 210.

Figure 3:
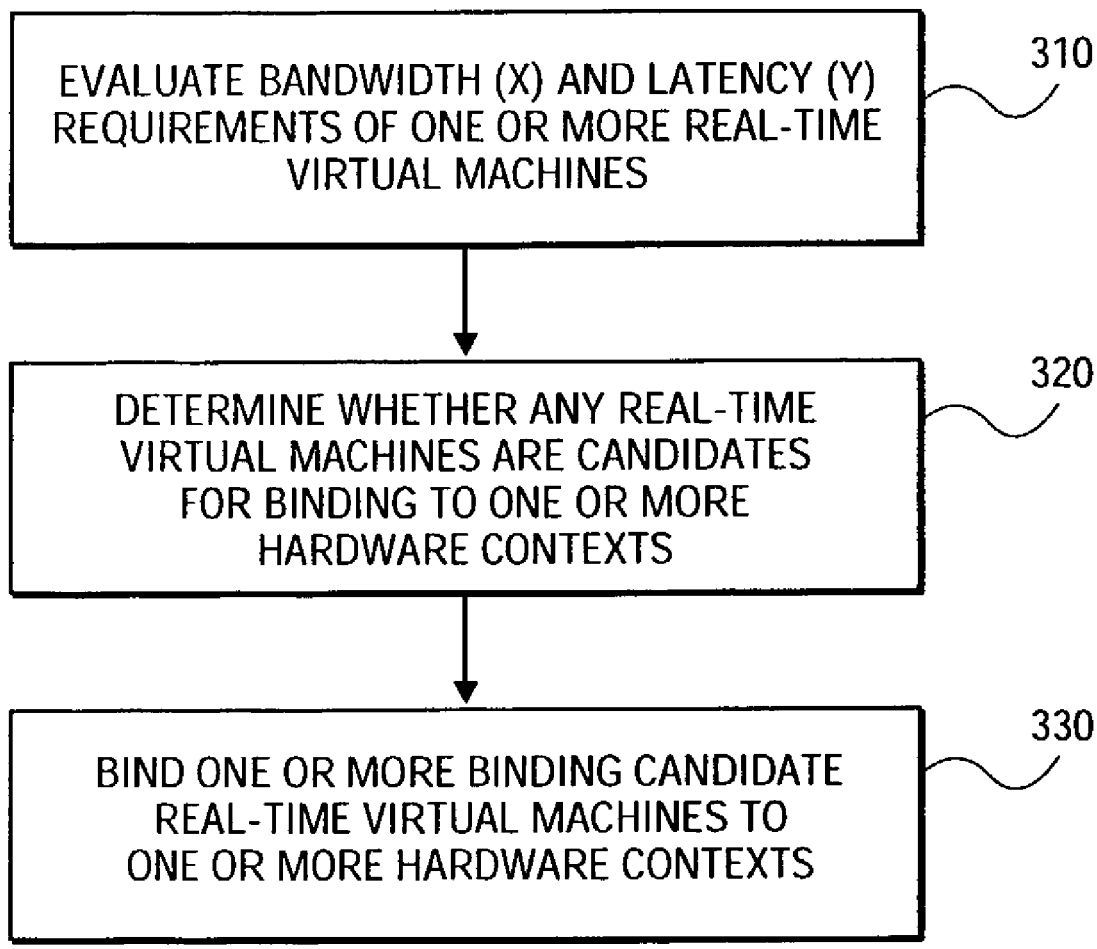
FIG. 3 illustrates one embodiment of a flow of actions taken by a virtual machine manager.

FIG. 3 illustrates one embodiment of a flow of actions taken by a virtual machine manager. The VMM first evaluates the bandwidth and latency requirements of one or more real-time virtual machines, as shown in block 310. Bandwidth and latency may be described as resource requirements of a virtual machine. Bandwidth is referred to by the variable X, and latency is referred to as the variable Y. Bandwidth refers to the amount of computing resources such as memory and other devices that are required by the particular virtual machine, and latency refers to how frequently the virtual machine requires access to the processor for execution. In one embodiment, bandwidth may be a tuple of values between 0 and 1, inclusive, which represent the fraction of corresponding resources the VM requires. In one embodiment, the tuple may be a quad tuple in which each element represents the fraction or percentage of processor, memory, display and disk resources required. For example, the tuple (0.5, 0.25, 0, 0.1) could represent a VM which requires 50% of the processor cycles, 25% of the system memory, 0% of the display (i.e., this VM is non-interactive) and 10% of the system disk bandwidth. The size of the tuple may vary depending on the components of a particular system. The resources represented in the tuple are not limited and are based on the hardware components of a particular system. In one embodiment, latency may refer to a period such as, for example, five milliseconds, or fifty microseconds, etc. which represents the longest duration for which the VM can be "held off" or delayed from execution. The VMM determines whether any real-time virtual machines are candidates for binding to one or more hardware contexts, as shown in block 320. The VMM binds one or more of the binding candidates; that is, real-time virtual machines, to one or more hardware contexts, as shown in block 330. Although the VMM is described in this paragraph as functioning solely with real-time virtual machines, the VMM may apply this same flow of execution to non-realtime virtual machines. Such an application may be desired if performance gains are to be realized. This is both system and processor dependent.

Figure 4:
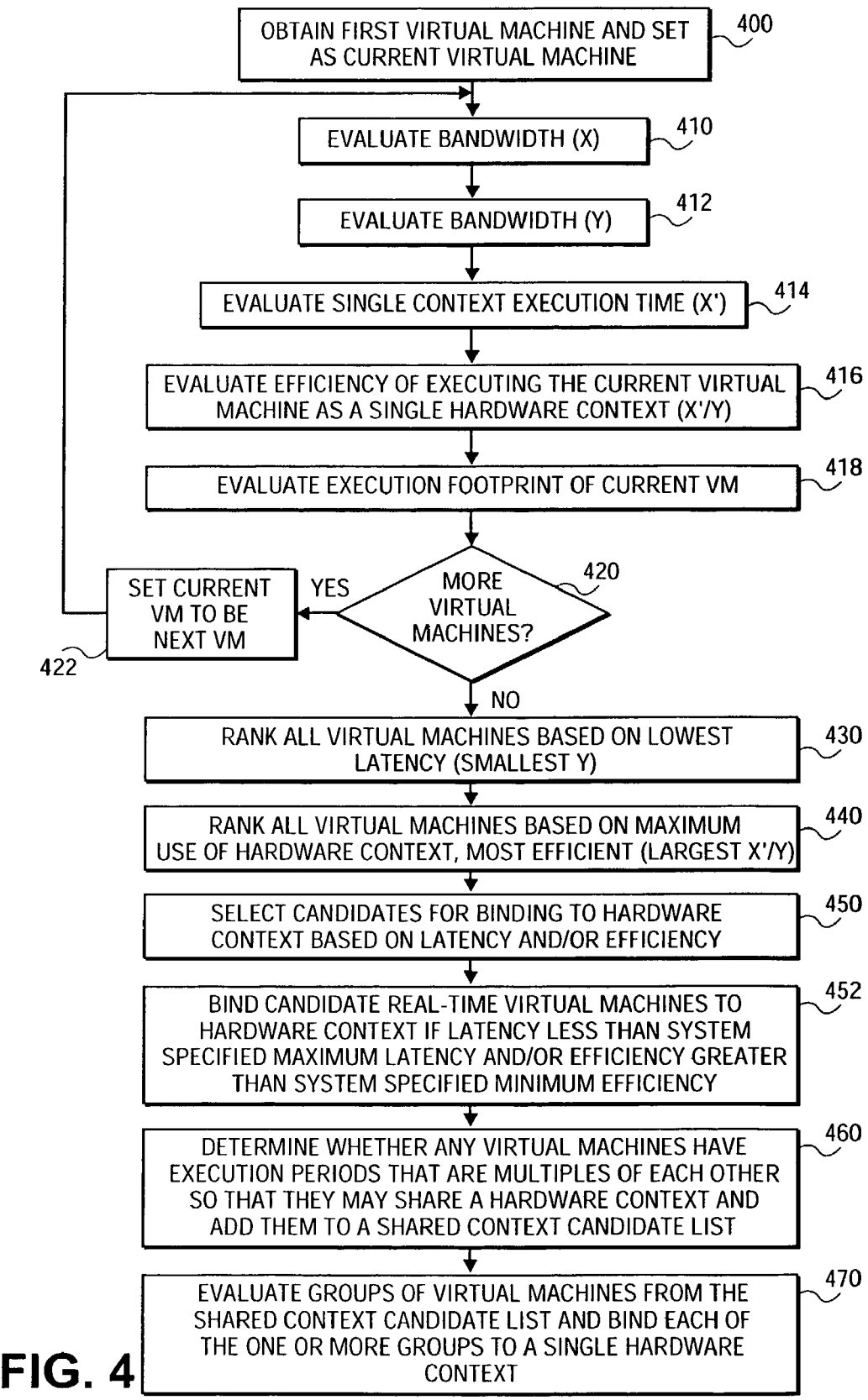
FIG. 4 illustrates a more detailed flow of actions of one embodiment of a virtual machine manager.

FIG. 4 illustrates a more detailed flow of actions of one embodiment of a virtual machine manager. In one embodiment, the VMM obtains a first virtual machine from a list of virtual machines and sets it as a current virtual machine, as shown in block 400. The VMM evaluates the bandwidth X of the current virtual machine, as shown in block 410. The latency Y of the current virtual machine is evaluated, as shown in block 412. In one embodiment, both the processor bandwidth X and latency Y may be expressed as milliseconds (ms.), such that the current virtual machine may be thought of as executing for X ms. every Y ms. In this way, the processor bandwidth X may be represented as a duration of execution, while latency Y may be though of as a period of execution, both measured in predetermined time units (e.g., milliseconds). In an alternate embodiment, the bandwidth and latency may both be values between 0 and 1, representing, respectively, a fraction of the processor cycles and a fraction of a second. There are various ways to evaluate the bandwidth and latency described herein. One such technique is detailed in U.S. patent application having Ser. No. 09/541,444.

The VMM evaluates the single context execution time X' of the current virtual machine, as shown in block 414. The single context execution time X' is a value that is smaller than the bandwidth X; X' is also referred to as nominal execution time as it takes into account the savings implicit in executing the current virtual machine as a single hardware context. The VMM evaluates the efficiency of executing the current virtual machine as a single hardware context by evaluating X'/Y, as shown in block 416. That is, to determine the efficiency of executing the current virtual machine as a single hardware context, the maximal use of processor resources is evaluated by dividing the single context execution time by the latency of the current virtual machine. The VMM evaluates the execution footprint of the current virtual machine, as shown in block 418. In one embodiment, the footprint may be determined by evaluating the amount of memory required for executing the current virtual machine. The footprint may be used in further evaluation of the current virtual machine.

The VMM checks to determine if there are any further virtual machines on a virtual machine list to evaluate, as shown in block 420. If there are additional virtual machines to evaluate, the VMM sets the current virtual machine to be the next virtual machine, as shown in block 422. The flow of execution continues at block 410.

After all virtual machines have been evaluated by the VMM in blocks 410 through 418, when there are no additional virtual machines on a virtual machine list to evaluate, as shown in block 420, execution continues at block 430.

The VMM ranks all virtual machines on the virtual machine list based on the lowest latency, that is, the smallest Y, as shown in block 430. In one embodiment, the ranking may be on a numerical scale in which the smaller the latency, the larger the ranking. The VMM may rank all virtual machines based on the maximal use of the hardware contexts, that is, the most efficient virtual machines, namely, those machines having the largest X'/Y, as shown in block 440. In one embodiment, the ranking may be on a numerical scale in which the more efficient the VM, the larger the ranking. The latency and efficiency rankings may be assigned according to any scale. The numeral scale described is only presented as an example. Other scales, such as by letter, and by any other kind of designator may be used.

The VMM selects a group of candidates for binding to a hardware context based on the latency and/or the efficiency, as shown in block 450. In one embodiment, the group of candidates may be determined as those top group of virtual machines that are ranked highest as determined in blocks 430 and 440. In various embodiments, the group of candidates may be a group of predetermined size, such as, for example, a group of two, a group of ten, or some other number. The VMM binds each of the group of candidate real-time virtual machines to a single hardware context if the latency of the VM is less than a system specified maximum latency and the efficiency of the VM is greater than a system specified minimum efficiency, as shown in block 452. In this way, if the group of candidates do not meet system specified threshold requirements, they are not bound to the hardware contexts. In another embodiment, this binding may proceed if only one of the latency and the efficiency are within system mandated constraints. In one embodiment, both the system specified maximum latency and the system specified minimum efficiency are set based on the speed of the particular processor. The system specified maximum latency and minimum efficiency may also be influenced by on-chip cache memory size, the size of all of the data needed for a hardware context, and other processor related factors.

The VMM determines whether any virtual machines have execution periods that are multiples of each other (i.e., are harmonic) such that they may share a hardware context, as shown in block 460. VMs that have execution periods such that one VMs execution period is an integral multiple of another VM's execution period do not conflict with one another are considered harmonic and may share a hardware context if there is sufficient processor bandwidth available (i.e., given VM A and VM B, $X'_A/Y_A + X'_B/Y_B <= 1.0$). If there are virtual machines that have execution periods that may share a hardware context, each group is added to a shared context candidate list, as shown in block 460. In this way, multiple virtual machines may share a single hardware context. That is, for example, if a virtual machine has a latency of once every three milliseconds, and another virtual machine has a latency of once every five milliseconds, these two virtual machines may efficiently share a single hardware context. The VMM evaluates virtual machine groups on the shared context candidate list and assigns each of one or more groups of virtual machines to single hardware contexts, as shown in block 470.

In addition, the VMM may bind groups of virtual machines having small footprints to single hardware contexts when the groups have latencies that are multiples of each other. That is, virtual machines that have latency periods that are multiples of each other may only share a hardware context when the total size of their footprints do not exceed the amount of resources available. In this way, both the resources required by a first virtual machine and a second virtual machine that share a hardware context may remain in memory, or otherwise be accessible, such that when they are alternately executed at their particular periods, no swapping or other related overhead is incurred. Other more complex sharing and scheduling schemes may be implemented.

In the foregoing specification, the invention has been described with reference to specific embodiments. It will be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
   obtaining resource requirements for a plurality of virtual machines;
   evaluating an efficiency of executing each of the virtual machines on a single hardware context, wherein the evaluating the efficiency comprises evaluating the single context execution time for each of the virtual machines, and dividing the single context execution time for each of the virtual machines by a latency of the virtual machine;
   selecting a candidate from the virtual machines based on the resource requirements and the evaluated efficiency; and
   binding the candidate to one of a plurality of hardware contexts associated with a processor.

2. The method of claim 1 wherein the resource requirements include a bandwidth and the latency for each of the virtual machines.

3. The method of claim 1 wherein the virtual machines are real-time virtual machines.

4. The method of claim 1 further comprising:
   selecting a group of candidate virtual machines based on the latency of and the efficiency of each of the virtual machine.

5. The method of claim 4 wherein binding is performed when at least one of the following is satisfied:
   the latency of at least one of the virtual machines of the group of candidate virtual machines is below a system specified maximum latency; and
   the efficiency of at least one of the virtual machines of the group of candidate virtual machines is greater than a system specified minimum efficiency.

6. The method of claim 1 further comprising:
   grouping those virtual machines that have execution periods that are multiples of each other; and
   assigning each of one or more groups of virtual machines having execution periods that are multiples of each other to a single hardware context of the plurality of hardware contexts.

7. The method of claim 6 wherein assigning comprises:
   evaluating the footprint of each of the virtual machines in each of the one or more groups of virtual machines having execution periods that are multiples of each other such that the assigning does not exceed an amount of available resources.

8. A method comprising:
   evaluating a bandwidth of each of a plurality of virtual machines, the bandwidth evaluated as an amount of required computing resources;
   evaluating a latency of each of the virtual machines;
   evaluating an efficiency of executing each of the virtual machines on a single hardware context, wherein evaluating the efficiency comprises evaluating a single context execution time for each of the virtual machines, and dividing the single context execution time for each of the virtual machines by the latency of the virtual machine;
   determining whether each of the virtual machines is a candidate for binding to one of a plurality of hardware contexts associated with a processor based on the latency, the bandwidth and the evaluated efficiency of each of the virtual machines; and
   binding at least one of a plurality of candidate virtual machines to one of the hardware contexts.

9. The method of claim 8 further comprising:
   selecting a group of candidate virtual machines based on the latency and the efficiency of each of the virtual machines.

10. The method of claim 8 wherein binding is performed when at least one of the following is satisfied:
    the latency of the at least one of the candidate virtual machines is below a system specified maximum latency; and
    the efficiency of the at least one of the best candidate virtual machines is greater than a system specified minimum efficiency.

11. The method of claim 8 further comprising:
    grouping those virtual machines that have execution periods that are multiples of each other; and
    assigning each of one or more groups of virtual machines having execution periods that are multiples of each other to a single hardware context of the plurality of hardware contexts.

12. The method of claim 11 wherein assigning comprises:
    evaluating the footprint of each of the virtual machines in each of the one or more groups of virtual machines having execution periods that are multiples of each other such that the assigning does not exceed the amount of available resources.

13. A system comprising a processor having a plurality of hardware contexts, a storage device, and a memory each coupled to a bus, the storage device including instructions which when executed by the processor cause the system to perform operations comprising:
    obtaining resource requirements for a plurality of virtual machines;
    evaluating an efficiency of executing each of the virtual machines on a single hardware context, wherein the evaluating the efficiency comprises evaluating the single context execution time for each of the virtual machines, and dividing the single context execution time for each of the virtual machines by a latency of the virtual machine;
    selecting a candidate from the virtual machines based on the resource requirements and the evaluated efficiency; and
    binding the candidate to one of a plurality of hardware contexts associated with a processor.

14. The system of claim 13 wherein the resource requirements include a bandwidth and the latency for each of the virtual machines.

15. The system of claim 13 wherein the storage device includes further instructions which when executed by the processor cause the system to perform further operations comprising:
    selecting a group of candidate virtual machines based on the latency of and the efficiency of each of the virtual machines.

16. The system of claim 15 wherein allocating is performed when at least one of the following is satisfied:
    the latency of at least one of the virtual machines of the group of candidate virtual machines is below a system specified maximum latency; and
    the efficiency of at least one of the virtual machines of the group of candidate virtual machines is greater than a system specified minimum efficiency.

17. The system of claim of claim 13 wherein the storage device includes further instructions which when executed by the processor cause the system to perform further operations comprising:

grouping those virtual machines that have execution periods that are multiples of each other; and assigning each of one or more groups of virtual machines having execution periods that are multiples of each other to a single hardware context of the plurality of hardware contexts.

18. The system of claim 17 wherein assigning comprises:

evaluating the footprint of each of the virtual machines in each of the one or more groups of virtual machines having execution periods that are multiples of each other such that the assigning does not exceed an amount of available resources.

19. A machine readable medium having instructions stored thereon which when executed by a processor cause the processor to perform operations comprising:

obtaining resource requirements for a plurality of virtual machines;

evaluating an efficiency of executing each of the virtual machines on a single hardware context, wherein the evaluating the efficiency comprises evaluating the single context execution time for each of the virtual machines, and dividing the single context execution time for each of the virtual machines by a latency of the virtual machine;

selecting a candidate from the virtual machines based on the resource requirements and the evaluated efficiency; and binding the candidate to one of a plurality of hardware contexts associated with a processor.

20. The machine readable medium of claim 19 wherein the resource requirements include a bandwidth and the latency for each of the virtual machines.

21. The machine readable medium of claim 19 wherein allocating comprises:

selecting a group of candidate virtual machines based on the latency of each of the virtual machines and on the efficiency of executing each of the virtual machines on a single hardware context.

22. The machine readable medium of claim 19 wherein allocating is performed when at least one of the following is satisfied:

the latency of at least one of the virtual machines is below a system specified maximum latency; and the efficiency of executing at least one of the virtual machines on a single hardware context is greater than a system specified minimum efficiency.

23. The machine readable medium of claim 19 wherein allocating comprises:

grouping those virtual machines that have execution periods that are multiples of each other; and assigning each of one or more groups of virtual machines having execution periods that are multiples of each other to a single hardware context of the plurality of hardware contexts.

24. The machine readable medium of claim 23 wherein assigning comprises:

evaluating the footprint of each of the virtual machines in each of the one or more groups of virtual machines having execution periods that are multiples of each other such that the assigning does not exceed an amount of available resources.

* * * * *

UNITED STATES PATENT AND TRADEMARK OFFICE
CERTIFICATE OF CORRECTION

PATENT NO. : 7,296,267 B2 Page 1 of 1
APPLICATION NO. : 10/194822
DATED : November 13, 2007
INVENTOR(S) : Cota-Robles et al.

It is certified that error appears in the above-identified patent and that said Letters Patent is hereby corrected as shown below:

In column 7, at line 27, delete "machine." and insert --machines.--.

Signed and Sealed this

Twenty Second Day of April, 2008

JON W. DUDAS
*Director of the United States Patent and Trademark Office*